United States Patent
Olsson et al.

(10) Patent No.: US 7,219,870 B2
(45) Date of Patent: May 22, 2007

(54) ZERO LOOSENESS FASTENER FOR LINKAGE ASSEMBLY

(75) Inventors: Nils O. Olsson, Glen Ellyn, IL (US); David C. Willms, Georgetown (CA)

(73) Assignee: Dura Global Technologies, Inc., Rochester Hills, MD (US)

( * ) Notice: Subject to any disclaimer, the term of this patent is extended or adjusted under 35 U.S.C. 154(b) by 0 days.

(21) Appl. No.: 09/993,362

(22) Filed: Nov. 16, 2001

(65) Prior Publication Data

US 2002/0064422 A1 May 30, 2002

Related U.S. Application Data

(62) Division of application No. 09/130,428, filed on Aug. 6, 1998, now abandoned.

(51) Int. Cl.
*F16M 13/00* (2006.01)

(52) U.S. Cl. ............ 248/421; 248/419; 411/501; 411/504

(58) Field of Classification Search ............ 248/421, 248/157, 419, 420; 411/504, 501
See application file for complete search history.

(56) References Cited

U.S. PATENT DOCUMENTS

| | | | | |
|---|---|---|---|---|
| 2,398,532 A | * | 4/1946 | Keehn | 411/15 |
| 3,561,792 A | * | 2/1971 | Cycowicz | 403/145 |
| 3,765,088 A | * | 10/1973 | Arff | 30/384 |
| 4,789,283 A | * | 12/1988 | Crawford | 411/43 |
| 5,014,958 A | * | 5/1991 | Harney | 248/394 |
| 5,075,909 A | * | 12/1991 | Arft | 5/13 |
| 5,337,995 A | * | 8/1994 | Satoh et al. | 248/394 |
| 5,374,022 A | * | 12/1994 | Gilmer et al. | 248/396 |
| 5,573,219 A | * | 11/1996 | Chinomi | 248/421 |
| 5,626,395 A | * | 5/1997 | Aufrere | 297/344.15 |
| 5,738,475 A | * | 4/1998 | Chaban | 411/501 |
| 5,782,533 A | * | 7/1998 | Fischer et al. | 248/421 |
| 5,806,824 A | * | 9/1998 | Isomura et al. | 248/396 |
| 5,863,098 A | * | 1/1999 | Kojima et al. | 248/421 |
| 5,882,061 A | * | 3/1999 | Guillouet | 248/421 |
| 6,216,851 B1 | * | 4/2001 | Mitas et al. | 198/844.2 |

* cited by examiner

*Primary Examiner*—Amy J. Sterling
(74) *Attorney, Agent, or Firm*—Richard M. Mescher; Porter Wright Morris & Arthur; Dean B. Watson

(57) ABSTRACT

A fastener is used to connect a first link to a second link in a vehicle seat assembly. The fastener has a head portion and a body portion extending outwardly from the head portion and defining an external diameter. The body portion is generally cylindrical and has a central bore with an internal diameter that is less than the external diameter. The method for connecting the first link to the second link with the fastener includes the steps of inserting the central body portion through aligned apertures in the links to form a subassembly and holding the subassembly fixed while a tooling member applies a linear load to the distal end of the body portion. The tooling member is inserted into the central bore and deforms the body portion for engagement with the first and second links to allow relative rotational movement between the links while eliminating relative linear movement therebetween.

12 Claims, 2 Drawing Sheets

ZERO LOOSENESS FASTENER FOR LINKAGE ASSEMBLY

CROSS-REFERENCE TO RELATED APPLICATIONS

This application is a divisional application of U.S. patent application Ser. No. 09/130,428 filed Aug. 6, 1998 now abandoned.

STATEMENT REGARDING FEDERALLY SPONSORED RESEARCH

Not Applicable

REFERENCE TO MICROFICHE APPENDIX

Not Applicable

FIELD OF THE INVENTION

This application relates to a fastener used for connecting a first link member to a second link member and more particularly to a fastener having a body portion that is deformed to engage the members in order to eliminate free play while still allowing relative rotational movement.

BACKGROUND OF THE INVENTION

Linkage assemblies are often used in seat assemblies to provide various functions including seat adjustment capability. Linkage assemblies typically include two or more link members, which are joined to each other by using various methods. The link members typically receive input from an adjuster control member which causes the links to rotate relative to one another to achieve a desired position. In known links, as the links rotate there has typically been free play or linear movement between the links. This free play is detrimental to the stability of the adjuster.

Various methods have been used to eliminate the free play between link members. Often bushings or bushing materials are used in the link assembly to take up the free play yet permit the links to rotate relative to one another. This is expensive and requires additional assembly time and materials.

Thus, it is desirable to eliminate the use of bushings and bushing type materials from linkage assemblies by providing a linkage assembly that uses a fastener which allows relative rotational movement between link members but eliminates free play between the members. By eliminating the use of bushings, the cost of the linkage assembly is reduced and assembly time is decreased.

SUMMARY OF THE INVENTION

In a disclosed embodiment, a fastener used to connect a first member to a second member includes a head portion and a body portion. Preferably, the first and second members are links in a seat adjuster assembly. The body portion extends outwardly from the head portion and defines an external diameter. The body portion is generally cylindrical and has a central bore with an internal diameter that is less than the external diameter. The body portion is deformable for engagement with the first and second members to allow relative rotational movement between the members while eliminating relative linear movement therebetween.

The preferred inventive method for connecting a first member to a second member includes providing a fastener having a head portion and a cylindrical body portion extending therefrom and terminating at a distal end, a first member having a first aperture, and a second member having a second aperture. The first aperture is aligned with the second aperture, the body portion of the fastener is inserted into the first and second apertures, and the body portion is deformed into engagement with the first and second members to allow relative rotational movement between the members while eliminating relative linear movement between the members.

Deforming the body portion of the fastener eliminates undesirable free play between the two members while still allowing the members to rotate with respect to each other. The fastener eliminates the use of expensive bushings and is easily installed, easily maintained, and is inexpensive. These and other features can be understood from the following specification and drawings.

DETAILED DESCRIPTION OF THE PREFERRED EMBODIMENT

Figure 1:
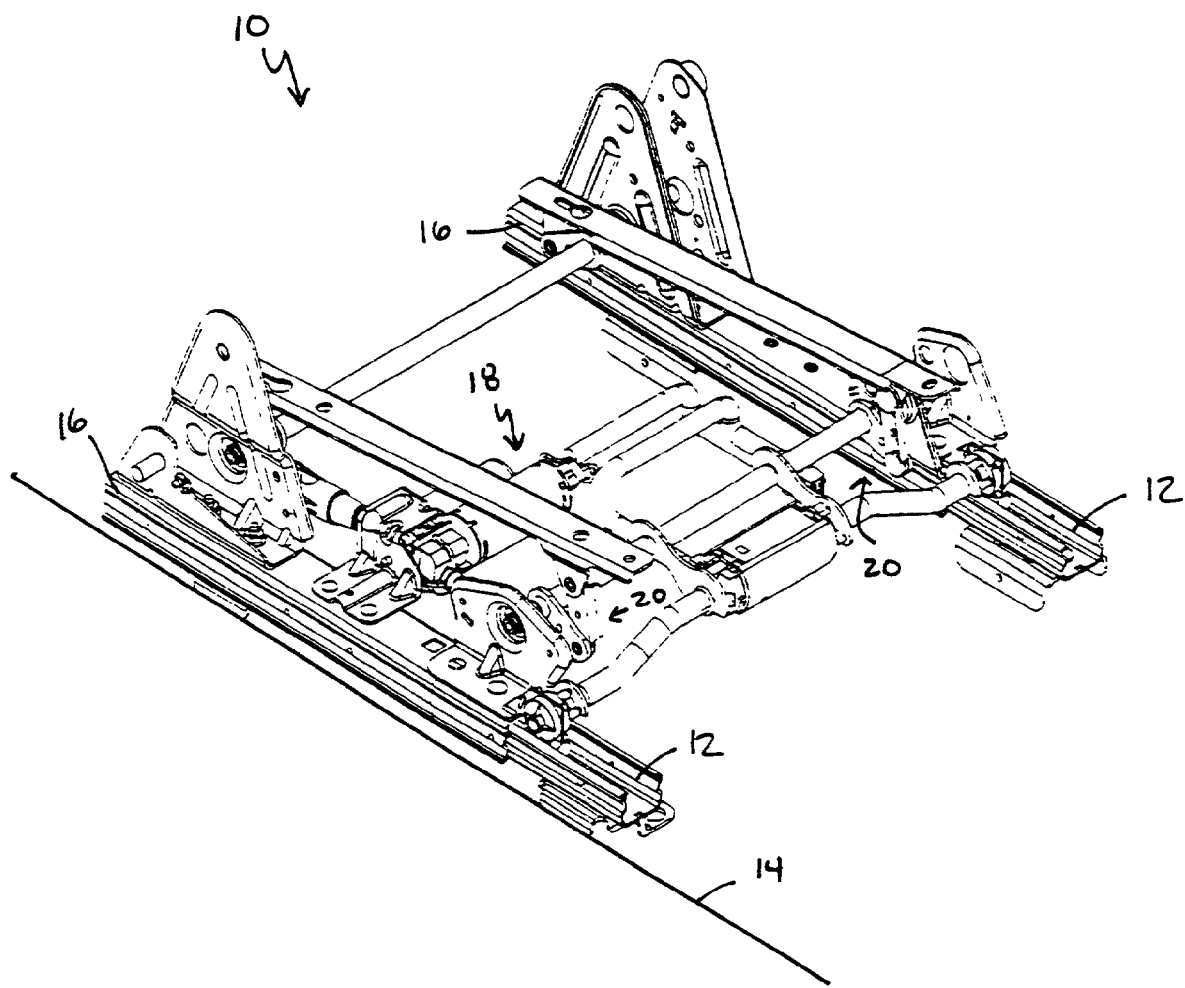
FIG. 1 is a perspective view of a seat track assembly with a linkage subassembly using the subject fastener.

A vehicle seat mounting assembly is shown generally at 10 in FIG. 1. The seat mounting assembly 10 includes a lower track 12 that is mounted to a vehicle floor 14 and an upper track 16 that slides with respect to the lower track 12 for seat adjustment in a forward or rearward position. The seat mounting assembly 10 also includes adjustment capability for adjusting the seat vertically. The vertical adjuster assembly is shown generally at 18 and includes a linkage assembly 20 which allows the seat to be raised or lowered to accommodate occupants of varying heights.

Figure 2:
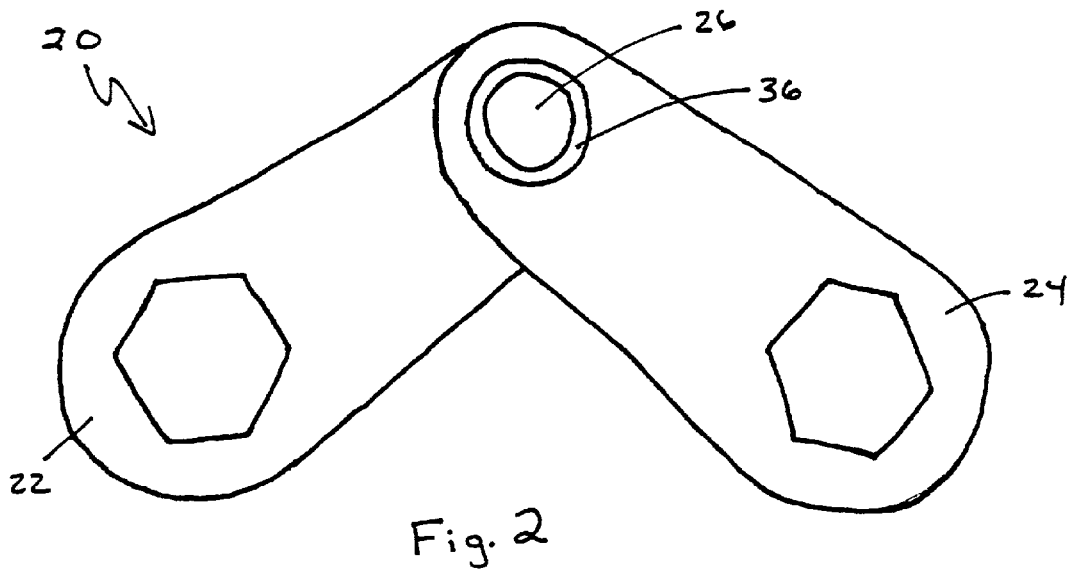
FIG. 2 is a top view of a linkage assembly with the subject fastener.

The linkage assembly 20 is shown in more detail in FIG. 2. A first link member 22 is connected to a second link member 24 with a fastener 26. A typical linkage assembly 20 includes at least two link members 22, 24, however, a greater number of link members can be used with the subject fastener. Only two link members 22, 24 are shown for simplicity. The fastener 26 used to connect the links 22, 24 allows the links to rotate relative to one another.

Figure 3:
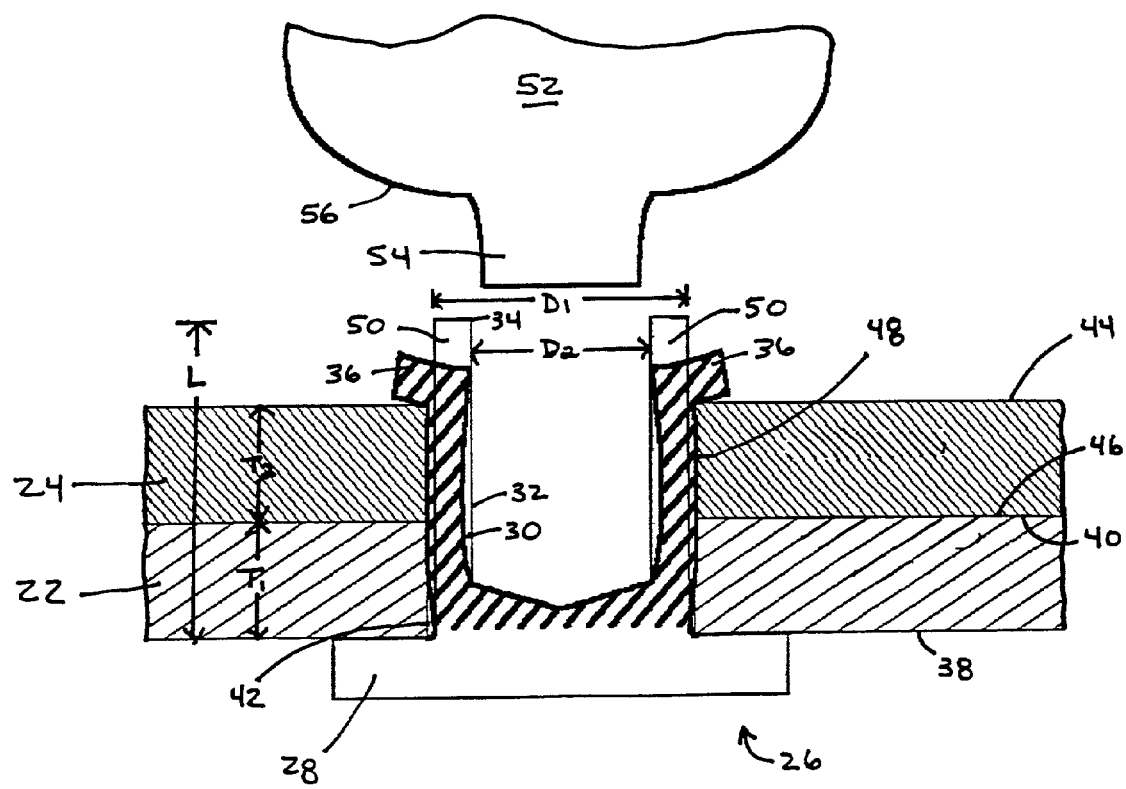
FIG. 3 is a cross sectional view of the linkage assembly of FIG. 2 shown with a tooling member.

A cross-sectional view of the inventive fastener 26 is shown in FIG. 3. The fastener is preferably made from a low carbon steel such as SAE 1010, however, aluminum, zinc or other materials well known in the art could be used. The fastener 26 includes a head portion 28 and a body portion 30 extending outwardly from the head portion 28 and defining an external diameter D1. The head portion 28 is preferably circular, however, other shaped heads could be used. The body portion 30 is cylindrical and has a central bore 32 with an internal diameter D2 that is less than the external diameter D1. The body portion 30 is preferably perpendicular to the head portion 28. The body portion 30 is deformable for engagement with the first and second link members 22, 24 to allow relative rotational movement between the members 22, 24 while eliminating undesirable relative linear movement or free-play between the members 22, 24.

The body portion terminates at a distal end 34, which receives a longitudinal load for deforming the body portion 30. The longitudinal load is preferably applied linearly to the distal end 34 of the body portion 30. The longitudinal load causes the internal and external diameters D1, D2 to increase resulting in the body portion 30 expanding outwardly to engage the first and second members 22, 24 to hold the fastener 26 firmly in place. The body portion 30 is preferably plastically deformed such that the shape and/or size of the body portion 30 is permanently changed due to the sustained application of the load beyond the elastic limit of the material.

The fastener 26 is shown in FIG. 3 before and after deformation. The post deformation fastener 26 is shown with the cross-hatched lines. As the load is applied to the distal end 34 of the body portion 30, the distal end 34 bends transversely to the longitudinal load and forms a lip for engaging one of the members. The lip 36 locks the fastener 26 to one of the members to prevent relative rotational movement between the one member and the fastener 26 while allowing the other member to move freely. Thus, the fastener 26 holds the link members 22, 24 together and allows relative rotational movement between the members 22, 24, but is fixed to one of the two link members to prevent rotation between that link member and the fastener 26. This will be discussed in greater detail below.

The first link 22 has a first external surface 38, a first internal surface 40, and a first aperture 42 extending between the external and internal surfaces 38, 40. The second link 24 has a second external surface 44, a second internal surface 46, and a second aperture 48 extending between the external and internal surfaces 44, 46. The body portion 30 is first inserted through the first and second apertures 42, 48 and then is plastically deformed to engage the first and second links 22, 24 to hold the fastener 26 in place.

The first link 22 has a first thickness T1, the second link 24 has a second thickness T2, and the body portion 30 has a length L that is greater than the sum of the first and second thicknesses T1, T2 such that when the internal face 40 of the first link 22 is placed against the internal face 46 of the second link 24 and the body portion 30 is inserted through the first and second links 22, 24, a segment 50 of the body portion 30 extends beyond the links 22, 24 as assembled. The linear load that is applied to the distal end 34 of the body portion 30 causes the segment 50 of the body portion 30 to bend transversely with respect to the linear load. This forms the lip 36 for engaging the external surface 44 of the second link 24. The second link 24 is locked to the fastener 26 via the lip 36 to prevent relative rotational movement between the second link 24 and the fastener 26 while allowing the first link 22 to move freely.

The method for connecting the first link 22 to the second link 24 includes the steps of aligning the first aperture 42 with the second aperture 48, inserting the body portion 30 of the fastener 26 into the first and second apertures 42, 48, and deforming the body portion 30 into engagement with the first and second links 22, 24 to allow relative rotational movement between the links 22, 24 while eliminating free play. The step of deforming the body portion 30 includes applying a longitudinal load to the distal end 34 of the body portion 30 to cause the deformation.

Additional steps include holding the internal face 40 of the first link 22 against the internal face 46 of the second link 24 and inserting the body portion 30 of the fastener 26 through the first and second apertures 42, 48 such that the head portion 28 engages the external face 38 of the first link while the segment 50 of the body portion 30 extends beyond the external face 44 of the second link 24. The longitudinal load is applied to the distal end 34 of the body portion 30 and the segment 50 of the body portion 30 bends transversely with respect to the longitudinal load to form the lip 36 that partially engages the external face 44 of the second link 24. As the lip 36 is bent under the load, the second link 24 is locked to the fastener 26 so that there is no relative rotational movement between the second link 24 and the fastener 26 while allowing the first link 22 to move freely.

A tooling member 52 is used to provide the load that deforms the body portion 30 of the fastener 26. First, a subassembly comprised of the first link 22, the second link 24, and the fastener is created. The subassembly is held fixed and the tooling member 52 is loved along a linear path toward the subassembly to engage the body portion 30 for deformation.

The tooling member 52 has an extension 54 with a diameter that is less than the internal bore diameter D2 and which has a curved exterior surface 56 surrounding the extension 54. The tooling member 52 applies the longitudinal load as the extension 54 is inserted into the bore 32 such that the curved exterior surface 56 engages the distal end 34 of the body portion 30, causing the body portion 30 to swell or expand outwardly. The distal end 34 of the body portion 30 is deformed by pressing the extension 54 further into the bore 32 causing the distal end 34 to bend outwardly along the curved surface 56 of the tooling member 52 to form the lip 36. Thus, once the body portion 30 has expanded with the apertures 42, 48 to its maximum limit, the segment 50 of the material is bent transversely to the load applied by the tooling member 52 to form the lip 36.

The use of the subject fastener in a linkage assembly 20 provides relative rotational movement between link members 22, 24 while eliminating undesirable free play or relative linear movement between the members 22, 24. This eliminates the need for expensive bushings or bushing type materials, thus reducing cost and assembly time.

Preferred embodiments of this invention have been disclosed, however, a worker of ordinary skill in the art would recognize that certain modifications would come within the scope of this invention. For that reason the following claims should be studied to determine the true scope and content of this invention.

What is claimed is:

1. A vehicle seat mounting assembly comprising, in combination:
   at least one movable seat track;
   a linkage assembly including:
   a first link having a first external surface, a first internal surface, and a first aperture with a first longitudinal length extending between the first external surface and the first internal surface;
   a second link having a second external surface, a second internal surface, and a second aperture with a second longitudinal length extending between the second external surface and the second internal surface; and
   a fastener having a head portion engaging the first external surface of the first link, a lip portion plastically deformed into engagement with the second external surface of the second link; and a cylindrical body portion extending from the head portion to the lip portion at a distal end opposite said head portion;
   wherein the head portion, the lip portion, and the body portion are formed by a single body of continuous material;
   wherein said body portion extends through said first and second apertures and is plastically deformed so that the body portion is expanded outwardly between the head portion and the lip portion and within the first and second apertures to engage the first and second links within the first and second apertures whereby the fastener secures the first and second links to allow relative rotational movement between the first and second links while preventing relative linear motion therebetween in all directions perpendicular to a direction the fastener is extending through the first and second links;

wherein said body portion has a hollow central bore extending from the lip portion toward the head portion;

wherein the central bore has a maximum internal diameter which extends through all of the second longitudinal length of the second aperture and more than half of the first longitudinal length of the first aperture so that the central bore extends a distance such that the body portion is plastically deformed into contact with the first link near the head portion within the first aperture to provide continuous surface to surface contact between the body portion and the first link from the first internal surface and extending in a direction toward the head portion for more than half the first longitudinal length of the first aperture which eliminates free play between the first link and the fastener; and wherein said linkage assembly is operably connected to said seat track to move said seat track.

2. A vehicle seat mounting assembly as recited in claim 1, wherein said first link has a first thickness, said second link has a second thickness, and said body portion has a length that is greater than the sum of the first thickness and the second thickness such that said first internal surface of said first link engages said second internal surface of said second link, said body portion extends through said first and second links, and said lip portion engages said second external surface of said second link.

3. A vehicle seat mounting assembly as recited in claim 1, wherein said second link is locked to said fastener via said lip portion to prevent relative rotational movement between said second link and said fastener while allowing said first link to move freely relative to said first link and said fastener.

4. A vehicle seat mounting assembly as recited in claim 1, wherein:

the first link has a first thickness between said first external surface engaged by the head portion and said first internal surface engaged by the second link;

the second link has a second thickness between said second external surface engaged by the body portion and said second internal surface engaged by the first internal surface; and the body portion has a length which is greater than the sum of the first thickness and the second thickness such that the first internal surface of the first link is positioned against the second internal surface of the second link, the body portion extends through the first and second apertures of the first and second links, and the lip portion is positioned against the second external surface of the second link.

5. A vehicle seat mounting assembly as recited in claim 1, wherein:

said first link has a first thickness;

said second link has a second thickness; and the central bore has a length which is greater than the first thickness and less than the sum of the first thickness and the second thickness.

6. A vehicle seat mounting assembly as recited in claim 1, wherein said central bore extends for a length less than the total length of the body portion.

7. A vehicle seat mounting assembly as recited in claim 1, wherein said central bore is open at the end of the body portion at the lip portion and is closed at the end of the body portion at the head portion.

8. A vehicle seat mounting assembly as recited in claim 1, wherein said linkage assembly is operably connected to said seat track to vertically move said seat track.

9. A vehicle seat mounting assembly as recited in claim 1, wherein said body portion comprises plastically deformable material for forming said lip portion and engaging the second link.

10. A vehicle seat mounting assembly as recited in claim 1, wherein the cylindrical body portion has an external diameter and said head portion is enlarged such that the head portion extends radially outward beyond the external diameter of the body portion.

11. A vehicle seat mounting assembly as recited in claim 1, wherein the distal end of the body portion is plastically deformed to form the lip portion.

12. A vehicle seat mounting assembly as recited in claim 1, wherein the body portion is expanded outwardly to engage the first and second links about an interface of the first internal surface of the first link with the second internal surface of the second link.

* * * * *